Dec. 17, 1968    M. C. KELSEY ET AL    3,416,357
GAS LEAK SURVEYING

Filed June 27, 1963    3 Sheets-Sheet 1

INVENTORS
MARTIN C. KELSEY,
EDWARD R. LOYD, JR.
BY  JAMES F. ROLLINS

ATTORNEYS

Dec. 17, 1968  M. C. KELSEY ET AL  3,416,357
GAS LEAK SURVEYING

Filed June 27, 1963  3 Sheets-Sheet 2

INVENTORS
MARTIN C. KELSEY,
EDWARD R. LOYD, JR.
BY  JAMES F. ROLLINS

Dunlap, Laney & Hubbard
ATTORNEYS

United States Patent Office 3,416,357
Patented Dec. 17, 1968

3,416,357
GAS LEAK SURVEYING
Martin C. Kelsey, Edward R. Loyd, Jr., and James F. Rollins, Dallas, Tex., assignors to Rayflex Exploration Company, Dallas, Tex., a corporation of Texas
Continuation-in-part of application Ser. No. 32,660, May 31, 1960, now Patent No. 3,107,517. This application June 27, 1963, Ser. No. 291,017
9 Claims. (Cl. 73—23)

This application is a continuation-in-part of applicants' co-pending application entitled Natural Gas Leak Detection filed May 31, 1960, Ser. No. 32,660, now Patent No. 3,107,517.

This invention relates generally to improvements in the detection of gas, such as natural gas, and more particularly, but not by way of limitation, relates to an improved method and apparatus for locating leaks in underground fuel gas lines.

The above mentioned co-pending application discloses a novel gas leak detection apparatus including a relatively large blower for drawing in a large sample of gas along the surface of the ground above a gas line, and means for directing a sample of the large volume of gas through an analyzer to provide assurance that the presence of a leak will be detected, even though the survey is being made under windy conditions. This apparatus has obtained substantial commercial success and has been a marked advance in the gas detection art. It has been found, however, that when gas is collected from a relatively limited area above the gas line, as is done when using a single relatively small probe on the front of the vehicle as disclosed in the above mentioned co-pending application, the collected gas will not indicate the relative size of a gas leak under all conditions. The apparatus is almost foolproof in obtaining a sufficient amount of the leaking gas to indicate the presence of a leak, but if the greatest concentration of leaking gas is located a short distance to the side of the path of travel of the probe, the analyzer will many times indicate the presence of a relatively small leak when the leak may be relatively large.

As it is well known in the art, a gas line is normally laid in a ditch, such that the soil used to fill the ditch above the gas line will normally not be as compacted as the soil on both sides of the ditch. As a result, gas leaking from the gas line will normally gravitate upwardly within the confines of the previously made ditch, and the relative size of the leak can be determined by sampling the gases above the ditch. In many instances we have found, however, that the leaking gas will be concentrated at the surface of the ground a few feet to the side of the axis of the gas line. This is particularly true when the surface of the ground above the underground gas line is covered with concrete, asphalt, or the like, such as is found in most urban areas, and has also been found to be true in some roadways that have been in use for several years since the gas line was laid under the roadway.

Perhaps the basic concept of this invention is to collect substantially uniform samples of gas from the surface of the ground above a gas line over a continuous area extending for the length of the gas line and for several feet on both sides of the gas line, and the continuous sampling of the collected surface gas which, upon analysis, will indicate not only the location of a leak, but also the relative size of the leak. In a preferred embodiment, this is accomplished by positioning a plurality of probes in substantially equally spaced relation along a line transverse to the axis of a gas line and moving the probes along the entire length of the gas line to be inspected. All of the probes are connected to a large blower through a mixing chamber, such that the surface scanned by each probe will overlap that scanned by an adjacent probe to effectively survey the surface on both sides of the gas line for several feet. The mixed surface gases drawn in by the blower are continuously sampled through a suitable gas analyzer, and the continuous analysis is recorded.

An object of this invention is to not only detect the presence of a leak in an underground gas line, but also to determine the relative size of the leak in the same operation.

Another object of this invention is to obtain the information necessary for scheduling the repairs of a leaking underground gas system.

Another object of this invention is to sample the surface gas over a large area above an underground gas line in a uniform and economical manner.

A further object of this invention is to efficiently survey an underground gas line for leaks, even though the gas line may be buried under a hard surface road bed.

Another object of this invention is to survey an underground gas line for leaks, even under adverse climatic conditions.

A still further object of this invention is to provide an apparatus for surveying an underground gas line for leaks which is simple in construction, may be economically manufactured and which will have a long service life.

Other objects and advantages of the invention will be evident from the following detailed description when read in conjunction with the accompanying drawings which illustrate the invention.

In the drawings:
FIGURE 1 is a schematic side view of a system constructed in accordance with this invention.

Figure 1:
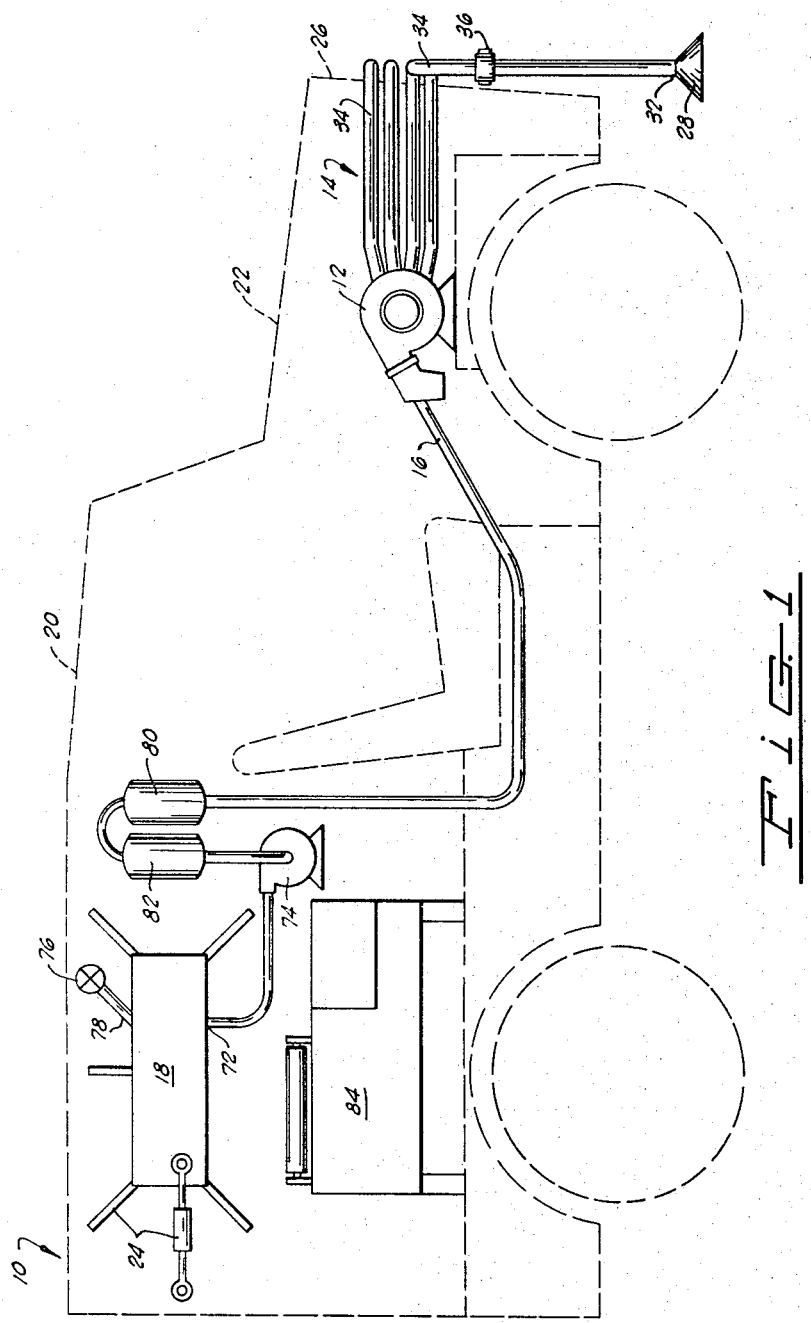

Referring to the drawings in detail, and particularly FIG. 1, reference character 10 generally designates a leak surveying system basically comprising a relatively large blower 12 for drawing in surface gases through a probe system 14 and for sending a sample of the mixed surface gases through a sample tube 16 to a suitable gas analyzer 18. The blower 12 has a large capacity, such as 12,000 cubic feet per hour, compared to the gas analyzer 18 which will normally have a gas capacity of about fifteen cubic feet per hour. The analyzer 18 may be of any desired type, such as infra-red, or what is known in the art as a flame ionization analyzer, although an infra-red analyzer is preferred by virtue of its greater sensitivity and selectivity in the gases analyzed.

The entire system 10 is carried by a suitable motor vehicle, such as a Jeep 20, and it is preferred that the blower 12 be located under the hood 22 of the Jeep in an accessible location away from the operator of the vehicle. The analyzer 18 is supported in the jeep 20 by a suitable suspension system 24, when the analyzer 18 is an infra-red type, to minimize vibration of the analyzer during movement of the vehicle 20 while making a survey.

Figure 2:
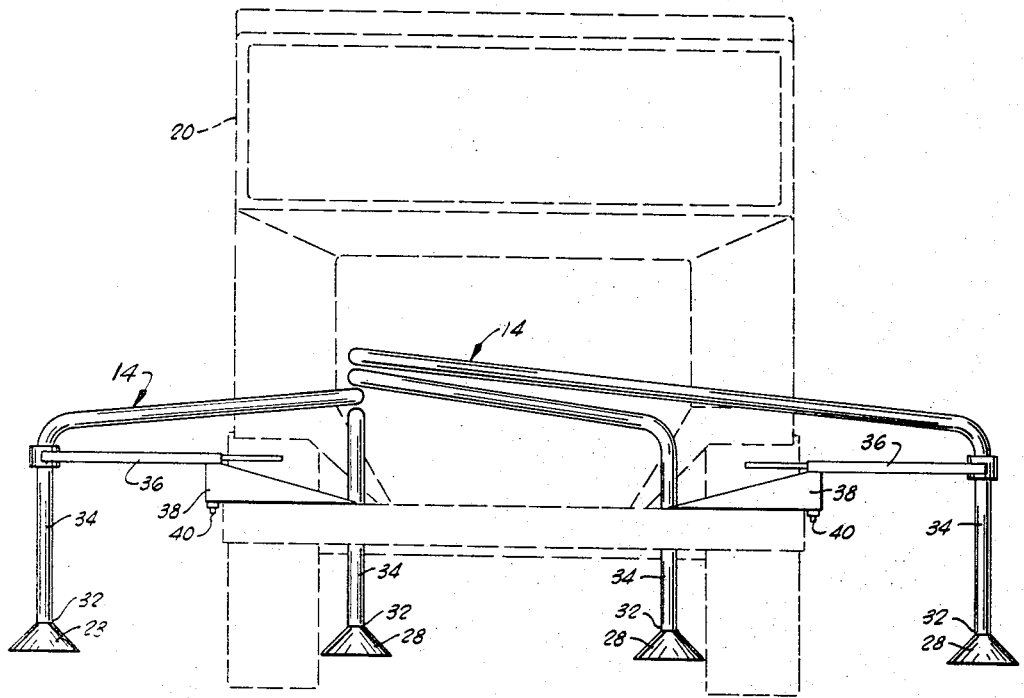
FIGURE 2 is a front view of a vehicle used in the present system, illustrating the placement of a plurality of probes.
Figure 5:
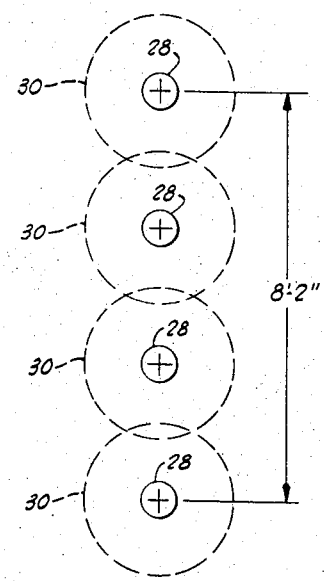
FIGURE 5 is a diagrammatic illustration of the areas from which surface gases are obtained by use of the probes shown in FIG. 2.

The probe system 14 is mounted on the front 26 of the vehicle 20, and a preferred form of the probe system is best shown in FIG. 2. The probe system 14 comprises a plurality of funnel-shaped members 28 positioned in proximity with the surface traveled over by the vehicle 20 to form scoops for surface gases. We have found that the use of four of the funnel-shaped members 28 arranged in a line substantially evenly spaced apart in a direction transverse to the path of travel of the vehicle 20 has been particularly effective in obtaining a uniform collection of the surface gases. FIGURE 5 illustrates the manner in which the funnel-shaped members 28 provide a substantially uniform collection of gases across an area extending transversely to the path of travel of the vehicle 20. As shown in FIG. 5, each funnel-shaped member 28 collects gases from a circular area 30 having a diameter substantially larger than the diameter of the respective funnel-shaped member, and the members 28 are so spaced that the collection areas 30 slightly overlap to assure a continuous collection of surface gases in the area extending across the front of the vehicle 20. When using a Jeep as the motor vehicle, the outermost funnel-shaped members 28 are spaced apart a distance of about eight feet two inches.

Referring again to FIG. 2, it will be noted that each funnel-shaped member 28 is secured on the lower end 32 of a tube 34. Each tube 34 is preferably in the form of a flexible hose in order that no damage will be done in the event one of the funnel-shaped members contacts an obstruction during a survey. Each of the outermost hoses 34 is supported on an arm 36 from a bracket 38 on the vehicle 20 through the medium of a vertical pivot pin 40 in order that the outermost hoses can be swung inwardly for storage when not in use. It will be seen that the arms 36 can be swung in horizontal planes over to the front of the vehicle 20 and not provide substantial projections on the opposite sides of the vehicle when it is desired to move the vehicle down a roadway from one inspection job to another. The innermost hoses 34 are supported in any suitable manner from the front portion of the vehicle 20 to hang downwardly in front of the vehicle in substantially equally spaced relation from the outer hoses 34, as previously indicated.

Figure 3:
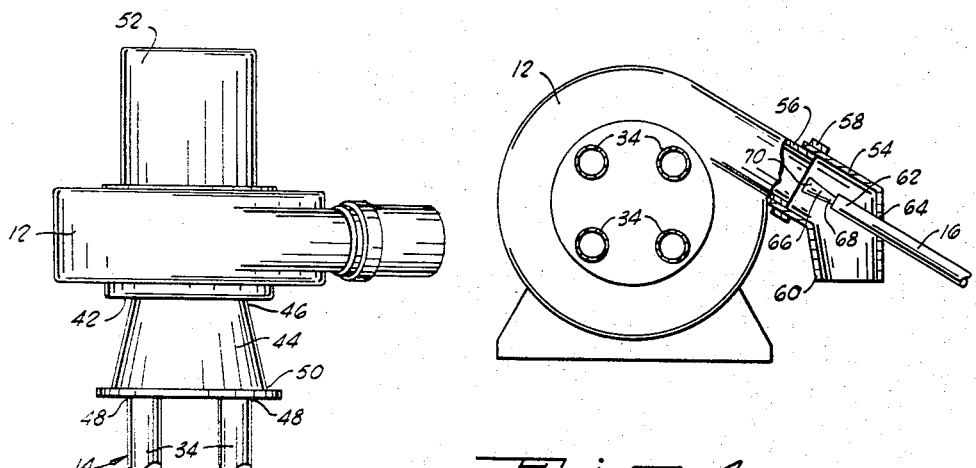
FIGURE 3 is an enlarged plan view of the blower assembly used in the present system.
Figure 4:
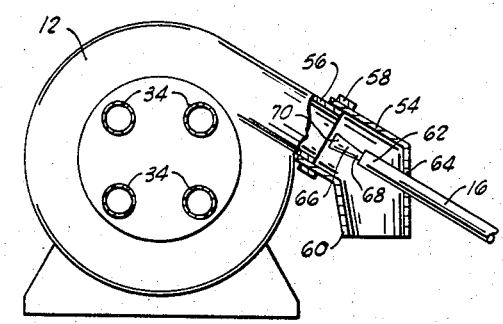
FIGURE 4 is a side view of the blower assembly, with portions of the structure shown in section to illustrate details of construction.

As schematically indicated in FIG. 1, and shown in detail in FIGS. 3 and 4, the hoses 34 are connected to the inlet 42 of the large blower 12. In a preferred embodiment, the hoses 34 are connected to the blower inlet 42 through a frusto-conical mixing chamber 44 to provide an efficient mixing of the surface gases being conveyed through the hoses 34. The small end 46 of the mixing chamber 44 is connected to the blower inlet 42 and the inner ends 48 of the hoses 34 are suitably connected to the large end 50 of the chamber 44, such as in a rectangular pattern as illustrated in FIG. 4.

The blower 12 is preferably operated by an electric motor 52, in order that the blower can be operated at a uniform speed to maintain the rated capacity of the blower and provide an efficient collection of surface gases through the probe system 14.

As shown most clearly in FIG. 4, a deflector 54 is secured over the outlet 56 of the blower 12 by a suitable fastener 58. The primary purpose of the deflector 54 is to direct the major portion of the mixed surface gases from the blower outlet 56 in a downward direction away from the vehicle 20 and in spaced relation behind the funnel-shaped members 28 of the probe system. Thus, the deflector 54 is merely a tubular member which is bent to extend its outer end 60 downwardly. Another purpose of the deflector 54 is to support one end portion 62 of the sample tube 16 in approximately the center of the blower outlet 56. The sample tube 16 is normally in the form of a plastic hose and is supported in an aperture 64 of the deflector 54 in the position shown in FIG. 4. A small funnel 66 has its small end 68 inserted in the end 62 of the sample tube and has its large end 70 positioned in the approximate center of the blower outlet 56 in order that a representative sample of the mixed surface gases will be directed into the sample tube 16.

Referring again to FIG. 1, it will be observed that the sample tube 16 extends to the inlet 72 of the analyzer 18 to direct the respective sample of the surface gases into and through the analyzer. It is preferred to use a small air pump 74 in the sample tube 16 having a capacity slightly greater than the capacity of the analyzer 18, such as a capacity of thirty cubic feet per hour, in order to force the sampled surface gases into the analyzer 18 under pressure. In this same connection, we utilize a metering valve 76 connected to the outlet 78 of the analyzer 18 which can be adjusted to control the pressure of the sample being passed through the analyzer. This feature is particularly important when operating the system at higher elevations in order to provide an easily detectable concentration of gas in the analyzer 18, regardless of atmospheric pressure.

A suitable dryer 80 is interposed in the sample conduit 16 upstream of the air pump 74 to remove moisture which may be entrained in the surface gases being analyzed. The dryer 80 contains a suitable desiccant, such as silica-gel. An ultrafine filter 82 is also interposed in the sample conduit 16 upstream of the air pump 74 to remove any solid particles which may be entrained in the surface gases to be analyzed. The filter 82 may be of any desired type which will perform the filtering function, such as the type made by Beckman Instrument Company of Fullerton, California under the trademark "Kel–F."

The response of the analyzer 18 is preferably recorded by a suitable recorder 84 mounted in the vehicle 20 to make a permanent record of a survey. The recorder 84 per se, forms no part of the present system and is, therefore, not described in detail herein.

OPERATION

Figure 6:
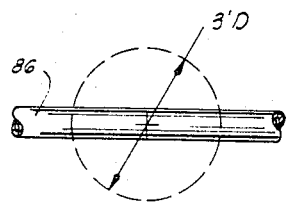
FIGURE 6 is a diagrammatic illustration of the pattern of leaking gas from a gas line buried in dry sand.
Figure 7:
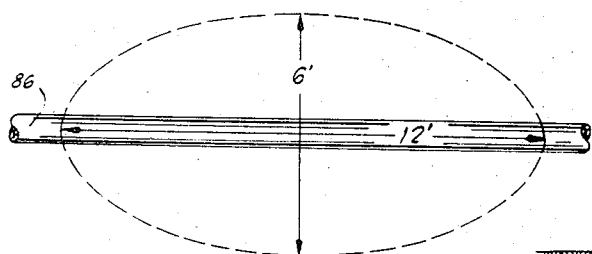
FIGURE 7 is a diagrammatic illustration of a typical surface configuration of gas leaking from a gas line buried in hard pan clay.
Figure 8:
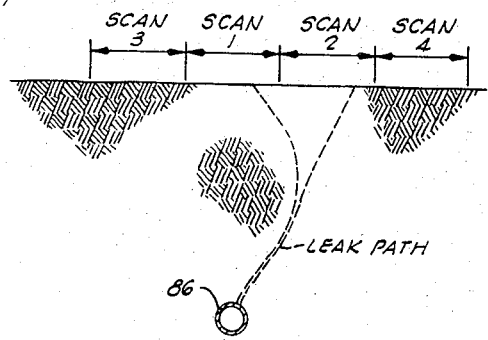
FIGURE 8 is a schematic vertical section through a gas line illustrating the manner in which leaking gas may appear at the surface at one side of the path of the gas line.

As previously indicated and as is well known in the art, a gas line, such as the gas line 86 shown in FIG. 6, is normally buried in a ditch and gas leaking from the gas line will tend to migrate upwardly through the ground within the confines of the ditch. The pattern of distribution of the leaking gas at the surface will depend upon the soil conditions, as well as the surface conditions. For example, gas leaking upwardly through dry sand will flow from the surface in a circular type pattern as indicated in FIG. 6, providing, of course, that the surface of the ground is not covered by concrete, asphalt or the like. As another example, gas leaking upwardly through hard pan clay will flow from the surface in a substantially elliptical pattern as illustrated in FIG. 7 with the major axis of the ellipse extending along the axis of the gas line 86. Here again, it is assumed that the surface is not covered by a relatively hard material. However, even under these relatively ideal conditions, it will be apparent that a probe having a relatively limited suction area would have to be moved precisely along the axis of the gas line 86 in order to provide an indication of the relative size of the leak. It will be apparent that if such a probe were moved over the surface even a short distance on either side of the axis of the gas line 86, that even though the probe would draw in some leaking gas and provide an indication that a leak was present, the amount of gas drawn in through the probe would not be indicative of the relative size of the leak. Further, the gas will frequently appear at the surface of the ground at a point or area to one side of the axis of the gas line, such as is illustrated in FIG. 8. This figure also illustrates that if gas is collected from an area directly above the gas line 86, indicating as the area "scan 1," the collected surface gas will contain a very minor portion of the leaking gas, even though a major leak may be in existence. On the other hand, if surface gas is collected over a substantial area on both sides of the gas line 86, as indicated by the areas marked "scan 2," "scan 3," "scan 4," and then the collected gases are mixed as contemplated by the present invention, a representative sample of the mixed surface gases will indicate not only the presence of the leak but also the relative size of the leak.

In use of the system 10 of this invention, the funnel-shaped members 28 of the probe system 14 are arranged as illustrated in FIG. 2, and then the blower 12, air pump 74 and analyzer 18 are placed in operation. The vehicle 20 is then driven over the path of the gas line being inspected, with the center line axis of the vehicle 20 being maintained in aligned relation with the axis of the gas line in so far as it is possible by following a map or plot of the gas system being inspected.

As the vehicle 20 proceeds along the path of the gas line, it will be apparent that a large volume of surface gas extending for several feet on both sides of the gas line will be drawn in through the probe system 14 and mixed in the mixing chamber 44 and blower 12. It may also be noted that the hoses 34 are of equal size, such that the amount of surface gas drawn in through each of the funnel-shaped members 28 will be substantially equal to provide a uniform collection of surface gases per square foot of surface area exposed to the action of the probe system. This is true for each increment of length of the gas line being inspected. As indicated in connection with FIGURES 5 through 8, the collection of surface gases over a wide transversal area over the gas line will assure that a representative sample of the collected surface gases will indicate not only the presence of the leak but also the relative size of the leak.

A representative sample of the mixed surface gases are fed through the funnel 66 into the sample tube 16 and are drawn through the dryer 80 and filter 82 and forced into the analyzer 18 by the air pump 74. Thus, the analyzer 18 will be operated continuously during a survey to analyze the surface gas along each increment of length of the gas line being inspected. At higher elevations, the metering valve 76 will be partially closed to retain a back pressure on the sample gas in the analyzer 18, such that the concentration of the gas being analyzed will be increased, relative to atmospheric conditions, and will increase the sensitivity of the analyzer.

As the survey is being made, the operator of the system makes indications on the record produced by the recorder 84 of visual landmarks, such that the leaks indicated on the record may be correlated with the physical location of the leak. Furthermore, the chart drive of the recorder 84 may be correlated to the speed of the vehicle 20 to povide a further assistance in the location of leaks indicated by the resulting record.

From the foregoing it will be apparent that the present invention provides a novel method and apparatus for efficiently surveying an underground gas line for leaks wherein the relative sizes of the leaks, as well as the locations of the leaks, will be determined. A survey of a section of an underground gas line may be completed in a relatively short period of time by simply moving the apparatus over the surface of the ground above the gas line. The collection of surface gases for several feet on both sides of the path of a buried gas line in a uniform pattern will provide a true sampling technique from which the relative sizes of leaks may be determined. When a gas line has several different leaks, but some more prominent than others, the maintenance scheduled for the gas line may be more efficiently determined.

Changes may be made in the steps and procedures or parts and elements as heretofore set forth in this specification and shown in the drawings without departing from the scope and spirit of the invention as defined in the following claims.

We claim:
1. A system for surveying for leaks in an underground gas line, comprising:
   a vehicle for movement over the ground along the path of the gas line;
   a gas analyzer carried by the vehicle having an inlet and an outlet;
   a blower carried by the vehicle having a gas capacity substantially greater than the gas capacity of the analyzer, said blower having an inlet and an outlet;
   probe means connected to the blower inlet comprising a plurality of evenly spaced funnel-shaped members arranged in a line transversely to the path of the gas line to draw gas into the blower from the surface of the ground over an area extending a plurality of feet on both sides of the gas line, said probe means being arranged to draw in said surface gas in substantially uniform amounts per square foot over the entire area surveyed over the gas line;
   means for mixing the surface gases drawn in through the probe means upstream of the blower; and
   means for feeding a continuous sample of the mixed surface gases from the blower outlet through the analyzer, whereby the response of the analyzer will indicate the relative sizes of leaks in the gas line.

2. A system as defined in claim 1 wherein said probe means is mounted on the front of the vehicle.

3. A system as defined in claim 2 wherein the vehicle is a motor vehicle and said probe means extends beyond the opposite sides of the vehicle.

4. A system as defined in claim 1 wherein said mixing means comprises a frusto-conical-shaped member having its smaller end connected to the blower inlet, and characterized further to include tubes connecting said funnel-shaped members to the larger end of said frusto-conical member.

5. A system as defined in claim 1 wherein said means for feeding a sample of mixed surface gases to the analyzer includes a sample tube having one end thereof inserted into the central portion of the blower outlet and the opposite end thereof connected to the analyzer inlet.

6. A system as defined in claim 5 characterized further to include a funnel having its small end secured in said one end of the sample tube and its larger end facing the flow of mixed surface gases in the blower outlet.

7. A system as defined in claim 5 characterized further to include an air pump interposed in the sample tube having a gas capacity larger than the gas capacity of the analyzer, but less than the gas capacity of the blower.

8. A system as defined in claim 7 characterized further to include a metering valve connected to the outlet of the analyzer to control the pressure of the mixed surface gas sample in the analyzer.

9. A system for surveying for leaks in an underground gas line, comprising:
   a vehicle for movement over the ground along the path of the gas line;
   a gas analyzer carried by the vehicle having an inlet and an outlet;
   a blower carried by the vehicle having a gas capacity substantially greater than the gas capacity of the analyzer, said blower having an inlet and an outlet;
   probe means connected to the blower inlet comprising a plurality of spaced funnel-shaped members arranged in a line transversely to the path of the gas line to draw gas into the blower from the surface of the ground over an area extending a plurality of feet on both sides of the gas line, said probe means being arranged to draw in said surface gas in substantially uniform amounts per square foot over the entire area surveyed over the gas line;
   means for mixing the surface gases drawn in through the probe means upstream of the blower;
   and means for feeding a continuous sample of the mixed surface gases through the analyzer, whereby the response of the analyzer will indicate the relative sizes of leaks in the gas line.

References Cited

UNITED STATES PATENTS 2,879,663  3/1959  Thomas _____ 73—26
3,107,517  10/1963  Loyd et al. _____ 73—23

RICHARD C. QUEISSER, *Primary Examiner.*

C. I. McCLELLAND, *Assistant Examiner.*

U.S. Cl. X.R.

73—40.5